May 30, 1967

J. K. LA FLEUR 3,321,930

CONTROL SYSTEM FOR CLOSED CYCLE TURBINE

Filed Sept. 10, 1965

INVENTOR.
JAMES K. LA FLEUR
BY
Max Gilder
ATTORNEY

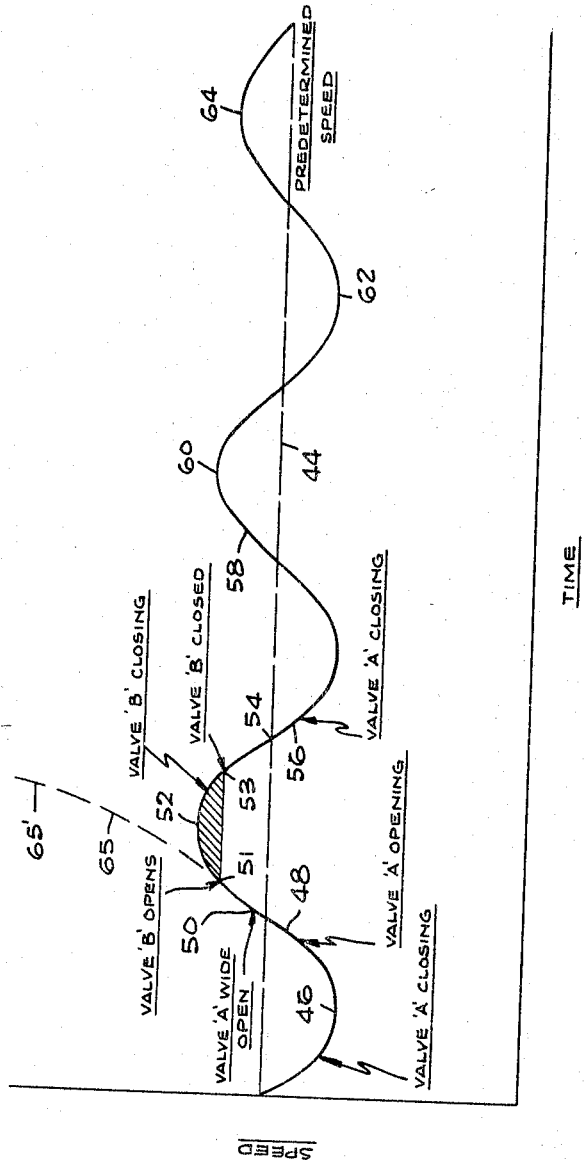

3,321,930
CONTROL SYSTEM FOR CLOSED
CYCLE TURBINE
James K. La Fleur, Hermosa Beach, Calif., assignor to
The La Fleur Corporation, Los Angeles, Calif., a corporation of California
Filed Sept. 10, 1965, Ser. No. 486,379
11 Claims. (Cl. 62—228)

This invention relates to a system for controlling thermal power plants in the form of a closed cycle, including a compressor, a heat source and a power turbine, and wherein a gaseous working medium is compressed, heated and expanded in the power turbine and then recirculated to the compressor. More particularly, the invention is concerned with a speed control system for closed cycle power plants and especially for a power-refrigeration system comprising two closed interconnected cycles, a power cycle and a refrigeration cycle, of the type described and claimed in my U.S. Patent 3,194,026.

Control systems have been developed for regulating the output of thermal power plants. Such power systems are either so-called stabilized or unstable systems. A closed cycle gas turbine system is inherently an unstable system, that is, it is in unstable equilibrium and will tend to set up oscillations at certain speeds, which if not properly controlled and damped out quickly, may result in the development of dangerous uncontrollable speeds which can cause serious damage to the rotating machinery.

Accordingly, for closed cycle power turbine systems various types of control or braking systems have been suggested to control fluctuations and speed of the power turbine in an effort to damp out such speed fluctuations and instability, and render the speed of the turbine as stable as possible. In order to accomplish this, a dissipation of energy is required from the turbine system which results in a waste of energy from the system. According to one conventional speed control system for a compressor-turbine combination, speed control is accomplished by means of control energy supplied externally of the system using separate high pressure compressors and storage tanks. However, such a system has the disadvantages that not only does it require the generation of external energy and power for such control, but involves the use of complex, bulky and expensive auxiliary control equipment.

One object of the invention accordingly is to control the speed of a power turbine in a closed cycle compressor-turbine combination employing a gaseous working medium so as to waste or dissipate as little output as possible from the compressor.

Another object of the invention is to control the speed of the power turbine in a closed cycle power system so as to maintain the speed of the system as stable as possible and to damp out speed fluctuations of the turbine rapidly and avoiding large fluctuations in speed and preventing the development of a dangerous unstable system.

Yet another object of the invention is the provision of a speed control system for a closed cycle power or power-refrigeration plant comprising a pair of closed interconnected cycles having a common compressor and in which a portion of the compressed working medium is bled from the power cycle and is circulated in a second closed cycle including a load, and preferably a refrigeration load, and wherein the control system is incorporated in the second closed cycle, said control system being simple and employing a minimum of energy from the output of the system for control purposes.

A still further object is to provide a control system for a closed cycle power or power-refrigeration system as described above, and wherein the control system employs only a small portion of the total energy in the system itself for speed control of the power turbine, and does not employ an external system employing a source of external energy for such control purposes.

Other objects and advantages of the invention will appear hereinafter.

According to the invention and in preferred practice for controlling the speed of a closed cycle turbine system employed in a compressor-turbine power combination and forming a first closed loop or cycle, and including a second closed interconnected cycle containing a load such as a refrigeration load, the compressor being common to both cycles, there is provided a system of valves in the second cycle to which gaseous medium from the compressor is bled from the power cycle, such valves being actuated in response to an increase or a decrease in the speed of the power turbine above or below a set predetermined speed to rapidly stabilize the turbine speed at such predetermined level. Preferably, such control system comprises two valves, one of which directs the output of the compressor which flows in such second cycle toward useful work, and the other of such valves operates essentially as a control valve for dissipating energy for speed control so as to reduce the speed of the turbine when in an overspeed condition. Thus, such last mentioned valve is normally maintained closed and is opened only when necessary for control of turbine overspeed. At the same time, the first or main control valve is generally maintained in open position to direct the output of the compressor to the load and is only partially closed for purposes of controlling the speed of the turbine to increase the speed thereof when the turbine is in an underspeed condition.

According to another feature of the invention, the auxiliary control valve which functions to dissipate energy and reduce the speed of the turbine when in an overspeed condition, is operatively associated with the heater employed in the main power cycle for heating the compressed working medium prior to its introduction into the power turbine, whereby if the speed of the power turbine continues to increase after such auxiliary valve is open wide, as for example where an accident occurs such as a break in the drive between the turbine and compressor, the heater is shut-off to close down the power system and thereby reduces the speed of the turbine to prevent a runaway condition.

Briefly, and according to the invention, there is thus provided a speed control system for a closed cycle power turbine, which comprises closed but interconnected first and second loops for the conduct therein of a gas working medium, a compressor interconnecting said loops, a turbine in said first loop in driving relation with said compressor, and a heat source in such first loop between such compressor and power turbine for heating the gas working medium prior to introducing said gas medium into the turbine. A load, e.g., a refrigeration load, is provided in the second loop, and for purposes of controlling the power turbine speed to correct either an overspeed or an underspeed condition according to the invention, there is also provided in said second loop a first valve means in series with the load, and a second valve means connected in parallel across such load. A speed sensor means is also provided for sensing the speed of the power turbine and a controller means is associated with such speed sensor means, said controller means being connected to the first and second valve means, and actuating such valve means in response to the speed sensed by the speed sensor means. Such first and second valve means are sequenced or programmed so that if the speed of the turbine increases above a set predetermined speed and the first or main valve control means is completely open, the controller means actuates the second or auxiliary control valve to open same and thereby reduce the speed of the turbine. Also, if the speed of the turbine decreases below the set predetermined speed, the first valve is actuated in a manner so as to increase turbine speed, as described more fully hereinafter.

The control system of the invention is particularly advantageous for use in the power-refrigeration system of my above Patent 3,194,026, since the control system including the control valve means noted above operates in the refrigeration cycle or the cycle which bleeds compressed working medium from the main power cycle, using the stored energy in such refrigeration cycle of the system and does not require externally supplied control energy for operation of a control system as in certain prior art systems. Further, the invention system has the important advantage of utilizing a minimum of waste or dissipation energy through the above noted auxiliary control valve, for purposes of controlling turbine overspeed, and the closed power system employing the speed control system of the invention therein, adjusts rapidly to fluctuations in power turbine speed either as result of overspeed or underspeed, to rapidly obtain a substantially stable equilibrium at the set predetermined speed of the power turbine.

The invention will be more clearly understood by reference to the description below of certain preferred embodiments, taken in connection with the accompanying drawings wherein:

FIG. 1 is a schematic representation of a closed cycle power turbine system employing the speed control system of the invention;

FIG. 2 is a plot illustrating the function of the control valves of the invention system for controlling and stabilizing turbine speed in the systems shown in FIGS. 1 and 3; and FIG. 3 is a schematic illustration of a power-refrigeration closed cycle system employing the speed control system in the refrigeration cycle thereof.

Referring to FIG. 1 of the drawing, there is illustrated a compressor-turbine closed cycle power system comprising a compressor 10 in which a gaseous working medium which can be air, or any other suitable working medium such as helium, for example, is compressed and is introduced through one side 12 of a heat exchanger 14 to increase the temperature of the compressed working medium, followed by passage of the so heated compressed medium into the heat exchanger coil 15 of a heater or combustion chamber 16 to further increase the temperature of the compressed power medium. The exiting compressed gas at high temperature is then introduced into the intake of the power turbine 18 which drives the compressor 10 and, if desired, any other suitable load as indicated at 21.

The expanded gases exhausted from the power turbine 18 are then recirculated through the low pressure side 20 of the heat exchanger 14 for heating the hot compressed gases and the exiting cooled working medium is then passed through a sump or cooler 22 and introduced at 24 into the intake of the compressor for recompression. A starter motor 25 is employed for purposes of spinning the power turbine 18 at the commencement of operation of the cycle.

In combination with the above described power cycle in FIG. 1 there is provided an interconnected closed cycle connected with the above described power cycle through the common compressor 10. In such second closed cycle a portion of the compressed working medium from the compressor is bled at 26 and circulated through a loop to a load indicated at 28, which can be any desired load such as an expansion turbine for driving a generator (not shown), and the working gas medium then circulated at 30 back to the intake of the compressor for recompression.

According to the invention, there is provided in line 26 between the exhaust of the compressor and the load 28 a valve indicated at A, and placed across lines 26 and 30 and in communication with the exhaust of compressor 10 and with the intake thereof, is a line 31 containing a valve B. A speed sensor or tachometer, indicated at 32 is connected as indicated at 34 to the shaft of the power turbine 18 to sense the speed thereof, and a controller indicated at 36 is operatively connected to the speed sensor for actuation thereby in response to the speed sensed by the speed sensor 32. The controller 36 is connected both to valves A and B as indicated at 38 and 40, for actuation of these valves in a certain sequence in response to an increase or decrease in the speed of the turbine with respect to a set predetermined speed, as sensed by the speed sensor, and more fully described below. Valve B is also operatively connected as indicated at 42 to the heater or combustion chamber 16 for heating the power medium in the power cycle, for inactivating or turning off the heat to the combustion chamber under certain conditions, also more fully described below. The speed sensor 32, the controller 36 and valves A and B are conventional mechanisms which per se form no part of the invention.

In the system shown in FIG. 1, valve A in series between the compressor exhaust and the load 28 is the main control valve and valve B shunted across or in parallel with the load and in communication with both the compressor exhaust and the compressor intake is an auxiliary control valve. It is seen that valve A directs useful output from the compressor 10 to the load 28 and is therefore maintained open as much as possible and is only closed to the extent necessary for control, and is generally not completely closed. On the other hand, valve B is used only for control purposes and is maintained closed as much as possible and is open only at those times and for as short a period as possible when necessary for overspeed control as pointed out more fully hereinafter.

In the operation of the control system in FIG. 1 for controlling the speed of the power turbine 18 and for stabilizing fluctuations in speed of this turbine, the turbine speed is initially set at a predetermined value by setting the controller or governor 36 at the desired position. This predetermined speed is indicated by the dotted line 44 in FIG. 2, showing a plot of turbine speed against time to illustrate the mode of operation of the control system for damping out speed oscillations according to the invention. As previously noted, in normal operation, valve A is completely open to direct working medium to the load 28 and valve B is closed.

Assuming now that the speed of turbine 18 falls below the predetermined or rated speed indicated at 44 in FIG. 2, the controller 36 actuated by the speed sensor 32 functions to actuate valve A to commence closing same. The closing of valve A decreases the load on the turbine, and such opening of the valve A continues until a point indicated at 46 in FIG. 2 at which point the valve A has been closed to such an extent that the speed of the turbine now increases as indicated at 48 on the curve in FIG. 2. As the speed of the turbine increases, valve A stops closing and then commences gradually to open again. It will be understood that valve A even when closed to its full extent, is generally not completely closed since this would otherwise remove all output to the load 28. Thus, A can, for example, be closed to a point where the output passing this valve can be reduced down to as low as 80% in some instances, but where the machine can be operated in a standby or idling condition then valve A can be closed completely during this period of control for bringing the turbine up to speed.

Now, as the speed of the turbine increases, and moves above line 44 in FIG. 2, valve A reaches a wide open position at a point indicated at 50, and this increases the load on the turbine, now tending to reduce its speed. However, assuming that the speed continues to increase after valve A is open wide, the controller 36 then actuates to open the auxiliary control valve B to further increase the load on the turbine and thereby further to reduce its speed.

During this period of closing of valve B, the turbine speed at first increases and reaches a maximum as indicated at 52 in FIG. 2, and then as the turbine speed commences to decrease, valve B commences to close and becomes fully closed in a relatively short period of time indicated by the point 53 in FIG. 2. During this entire period of the opening and closing of valve B, valve A is of course wide open. After valve B closes and the speed of the turbine is reducing and approaching the predetermined speed as indicated at point 54 in FIG. 2, valve A continues to remain open.

Now since the speed of the turbine is of course oscillating from underspeed to overspeed, and from overspeed to underspeed in alternating fashion until such oscillations are completely damped out, as indicated in FIG. 2, the mode of operation and sequencing of the valves A and B continues in the manner described above as the speed of the turbine now assumes an underspeed condition as indicated at 56 in FIG. 2, the same cycle of operation of first the closing of valve A and the gradual opening thereof to assume an overspeed condition as indicated at 58 in FIG. 2, followed by an opening of valve B to again decrease the speed of the turbine, continues at progressively smaller oscillations as indicated at 60, 62 and 64 in FIG. 2, until such oscillations are substantially completely damped out and the turbine speed and output attains a relatively stable value in the vicinity of the predetermined speed line 44. These oscillations in speed as described above occur over a relatively short period of time, employing the control system of the invention to attain speed stabilization within a relatively short period following the setting up of such oscillations.

It will be particularly noted in FIG. 2 that the valves A and B are sequenced so that valve A must be completely open before the auxiliary control valve B is opened and that valve B must be completely closed before valve A begins to close. This is the general mode of sequencing of the valves as the system proceeds from an overspeed to an underspeed condition with respect to the set predetermined speed line 44. Of particular significance, it is noted in FIG. 2 that valve B is only open or partially open during a relatively short period as indicated by the shaded area between and above points 51 and 53 in FIG. 2. Since the opening of valve B wastes turbine output by shunting compressed working medium across the load 28 back to the compressor inlet, the control system of the invention only wastes a relatively small amount of power in controlling the turbine speed. Further, it is noted that contrary to prior art control systems which employ external energy for control purposes, the control system of the invention incorporated in that portion of the closed cycle including the load 28 uses the stored energy in this portion of the cycle itself for speed control purposes and primarily for operation of the auxiliary control valve B. Hence, the control system of the invention wastes a minimum of output and such small amount of wasted output is that which is produced in the system itself.

If after valve B opens to correct an overspeed condition as above described, the turbine speed continues to increase as indicated by dotted line 65 in FIG. 2, when valve B is wide open, as for example where an accident such as the breaking of the coupling between the power turbine 18 and the compressor 10 may occur, valve B under these conditions is set to actuate the heater 16 at a predetermined maximum speed of the turbine, indicated at point 65', to shut off the heater and permit the turbine to reduce its speed to a controllable level.

FIG. 3 shows a power-refrigeration system of the type described in my above Patent 3,194,026 and employing the speed control concept of the invention. The system shown in FIG. 3 comprises two interconnected cycles or loops as in the embodiment of FIG. 1, namely, a closed power cycle or loop indicated at 66 and a closed refrigeration loop indicated at 68 having the common compressor 10 interconnecting the loops. The power cycle 66 in FIG. 3 is the same as the power cycle described above with respect to FIG. 1. As in the embodiment of FIG. 1, a common gas working medium is employed in both the power and refrigeration cycles 66 and 68 in FIG. 3, the exemplary working medium employed in the power refrigeration system of FIG. 3 being helium. Thus, by way of an example of operation, helium enters the compressor 10 at 24 in FIG. 3 at a pressure of about 180 p.s.i. and at ambient temperature of 530° "Rankine" (R.), or about 70° F., and is discharged from the high pressure side 11 of the compressor to the heat exchanger or hot regenerator 14 at about 270 p.s.i. In the combustion heater 16 of FIG. 3, the helium passing through the heat exchanger coil 15 of the combustion chamber is heated to a final temperature of about 1,660° R. prior to its entry into the power turbine 18.

In the refrigeration cycle of FIG. 3, a second stream of compressed helium at 70 is taken from the compressor 10, passes first through the heat exchanger coil 71 of a heat sump or cooler 72, then through one side 74 of the heat exchanger or cold regenerator 76 for further cooling of the compressed helium, and the cold compressed exiting helium is then introduced into a cold turbine wherein the helium is expanded, with a drop in temperature thereof to about 130° R. The cold turbine 78 can be used to power a generator 79, or if desired the cold turbine 78 can drive a separate compressor, or it can be positioned with respect to the main compressor 10 to aid in supplying power to such compressor. The cold expanded low pressure helium from the exhaust of the cold turbine 78 then passes through the heat exchanger coil 80 or other conduit means in heat exchange relation with a refrigeration load indicated at 81. The load 81, for example, can be a gas such as nitrogen which is to be liquefied, or such load can be the top of a fractionating column for liquefying air. From the load coil 80 the low pressure helium returns to the regenerator 76, passing through the other side 82 thereof to serve to cool the compressed helium passing through the high pressure side 74 of the exchanger. The helium then completes its refrigeration loop by returning through line 84 to the compressor inlet. In FIG. 3 the helium returning to the intake of the compressor at 24 in the power cycle 66, and at 84 in the refrigeration cycle 68, is at the same pressure of about 180 p.s.i.

According to the invention, the main control valve A', corresponding to control valve A in FIG. 1, is positioned in series in the line between the cooler 72 and the regenerator 76, and the auxiliary control valve B', corresponding to valve B in FIG. 1, is positioned in a line 85 which connects at one end with the compressed helium line between cooler 72 and valve A', and at the other end is connected to the return low pressure helium line 84. In the power-refrigeration system of FIG. 3, valves A' and B' therein function in the same manner as described in the embodiment of FIG. 1 above with respect to valves A and B therein, to control the speed of the power turbine 18 in order to correct either an overspeed or an underspeed condition to rapidly damp out such speed fluctuations and return the system to a relatively stable condition. As in the case of the embodiment of FIG. 1, the control system in the power-refrigeration system of FIG. 3, including the valves A' and B' therein, operate using the stored energy in the load or refrigeration cycle 68 of this system, particularly for the dissipation of energy required when the auxiliary valve B' is opened to correct an overspeed condition as above described.

From the foregoing, it is seen that the invention provides a simple and substantially low cost system for controlling the speed and output of a closed cycle power turbine system, thus avoiding the complex and costly equipment of prior art systems, and in addition has the advantage of employing the energy of the system itself for operation of the speed control system, thus eliminating the necessity for the use of energy from an extraneous source for operation of the control system as in prior art systems.

While I have described particular embodiments of my invention for the purpose of illustration, it should be understood that various modifications and adaptations thereof may be made within the spirit of the invention, and within the scope of the appended claims.

I claim:

1. A speed control system for a closed cycle power turbine, which comprises closed but interconnected first and second loops for the conduct therein of a gas working medium, a compressor interconnecting said loops, a turbine in said first loop in driving relation with said compressor, a heat source in said first loop between said compressor and said turbine, for heating the gas working medium prior to introducing said gas medium into said turbine, a load in said second loop, a first valve means in said second loop in series with said load, a second valve means in said second loop connected in parallel across said load, speed sensor means for sensing the speed of said turbine, a controller means associated with said speed sensor means, said controller means being connected to said first and second valve means, and actuating said first and second valve means in response to the speed sensed by said speed sensor means, said first and second valve means being sequenced for actuation by said controller means so that if the speed of said turbine increases above a set predetermined speed and said first valve means is completely open, said controller means actuates said second valve means to open same and reduce the speed of said turbine.

2. A speed control system for a closed cycle power turbine, which comprises closed but interconnected first and second loops for the conduct therein of a gas working medium, a compressor interconnecting said loops, a turbine in said first loop in driving relation with said compressor, a heat source in said first loop between said compressor and said turbine for heating the gas working medium prior to introducing said gas medium into said turbine, a load in said second loop, a first valve in said second loop between the exhaust of said compressor and said load, and a second valve in said second loop positioned across said load and communicating with the exhaust of said compressor upstream from said first valve and with the inlet of said compressor downstream from said load, speed sensor means for sensing the speed of said turbine, a controller means associated with said speed sensor means, said controller means being connected to said valves and actuating said valves in response to the speed sensed by said speed sensor means, said valves being sequenced for operation by said controller means so that said second valve opens only when said first valve is completely open, and said first valve commences to close only when said second valve is completely closed, said second valve controlling the upper speed limit of said turbine, and being actuated by said speed sensor means to open when the speed of said turbine increases above a set predetermined speed, said first valve controlling the lower speed limit of said turbine and being actuated to open when the speed of said turbine decreases below said set predetermined speed.

3. A speed control system as defined in claim 2, said first valve being actuated by said speed sensor means to open in response to an increase in speed of said turbine from an underspeed condition to a speed approaching said set predetermined speed, said second valve being actuated by said speed sensor means to open after said first valve is completely open, in response to a further increase in speed above said set predetermined speed.

4. A speed control system as defined in claim 2, said second valve being actuated by said speed sensor means to close in response to a reduction of speed of said turbine from an overspeed condition to a speed approaching said set predetermined speed, said first valve being actuated by said speed sensor means to thereafter close in response to a further reduction in speed below said set predetermined speed.

5. A speed control system as defined in claim 1, said second valve means being operatively associated with said heat source and inactivating said heat source if the speed of said turbine increases to a predetermined maximum speed when said second valve means is completely open.

6. A speed control system as defined in claim 2, said second valve being operatively associated with said heat source and inactivating said heat source if the speed of said turbine continues to increase to a predetermined maximum value when said second valve is completely open.

7. A speed control system as defined in claim 2, said load being a refrigeration load, said second loop including a regenerator and a cold turbine, the exhaust from said cold turbine being connected to said refrigeration load, and the working medium outlet of said refrigeration load being connected to the intake of said compressor via said regenerator.

8. A power-refrigeration system including a speed control, comprising closed but interconnected hot and cold loops for the conduct of a gas working medium through such loops, a compressor having an inlet and an outlet, said compressor being common to such loops, and each loop having a connection to the inlet and the outlet of said compressor to provide such loops' interconnection, said hot loop having therein, in addition to said compressor, in series from said compressor outlet to said compressor inlet, a hot regenerator, a heater having a high temperature heat source, the inlet of a hot turbine, such hot turbine, the outlet of such turbine, said hot regenerator, and a hot loop heat sump; said cold loop having therein, in addition to said compressor, in series from said compressor outlet to said compressor inlet, a cold loop heat sump, a first valve, a cold regenerator, the inlet of a cold turbine, such cold turbine, the outlet of such cold turbine, a refrigeration load, said cold regenerator, and a second valve in said cold loop position in parallel with and across said refrigeration load, said second valve communicating with the exhaust of said compressor upstream from said first valve, and with the inlet of said compressor downstream from said cold regenerator, speed sensor means for sensing the speed of said hot turbine, controller means associated with said speed sensor means, said controller means being connected to said valves and actuating said valves in response to the speed sensed by said speed sensor means, said valves being sequenced for operation by said controller means so that said second valve opens only when said first valve is completely open, and said first valve commences to close only when said second valve is completely closed, said second valve controlling the upper speed limit of said hot turbine, and being actuated by said speed sensor means to open when the speed of said hot turbine increases above a set predetermined speed, and said first valve controlling the lower speed limit of said hot turbine and being actuated to open when the speed of said hot turbine decreases below said set predetermined speed.

9. A power-refrigeration system as defined in claim 8, said first valve being actuated by said speed sensor means to open in response to an increase in speed of said hot turbine from an underspeed condition to a speed approaching said set predetermined speed, said second valve being actuated by said speed sensor means to open after said first valve is completely open, in response to a further increase in speed above said set predetermined speed.

10. A power-refrigeration system as defined in claim 8, said second valve being actuated by said speed sensor means to close in response to a reduction of speed of said hot turbine from an overspeed condition to a speed approaching said set predetermined speed, said first valve being actuated by said speed sensor means to thereafter close in response to a further reduction in speed below said set predetermined speed.

11. A power-refrigeration system as defined in claim 8, said second valve being operatively associated with said heat source and inactivating said heat source if the speed of said hot turbine continues to increase to a predetermined maximum speed when said second valve is completely open.

References Cited

UNITED STATES PATENTS

| | | | |
|---|---|---|---|
| 2,642,721 | 6/1953 | Mallinson | 60—59 |
| 3,201,941 | 8/1965 | La Fleur | 60—59 |

MEYER PERLIN, *Primary Examiner.*